Oct. 6, 1970　　　　　T. O. PAINE　　　　　3,532,975
DEPUTY ADMINISTRATOR OF THE NATIONAL
AERONAUTICS AND SPACE ADMINISTRATION
INSTRUMENT FOR MEASURING POTENTIALS ON TWO-DIMENSIONAL
ELECTRIC FIELD PLOTS
Filed July 31, 1968
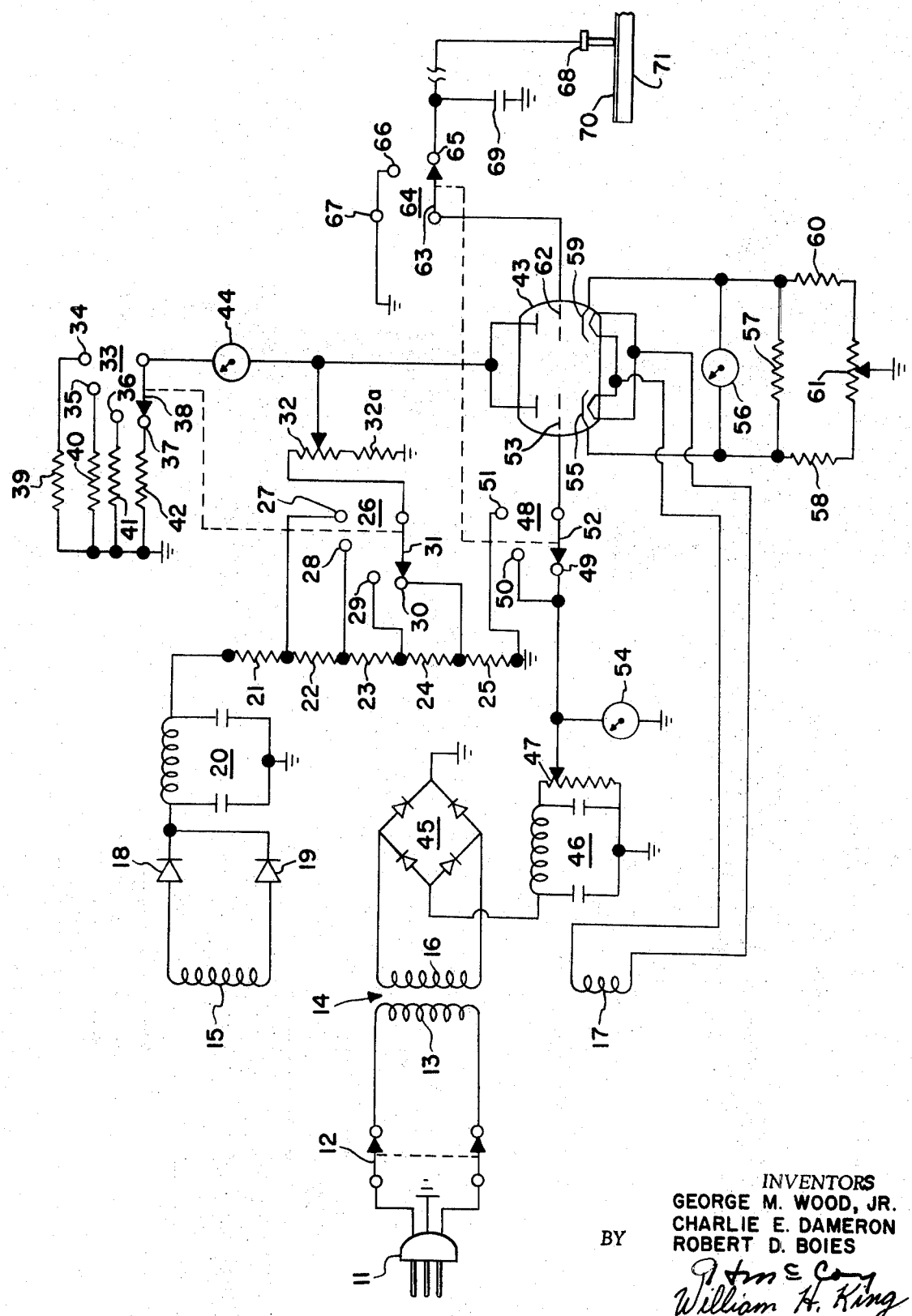
INVENTORS
GEORGE M. WOOD, JR.
CHARLIE E. DAMERON
ROBERT D. BOIES
BY
*William H. King*
ATTORNEYS

United States Patent Office 3,532,975
Patented Oct. 6, 1970

3,532,975
INSTRUMENT FOR MEASURING POTENTIALS ON TWO-DIMENSIONAL ELECTRIC FIELD PLOTS
T. O. Paine, Deputy Administrator of the National Aeronautics and Space Administration, in respect to an invention of George M. Woods, Jr., and Charlie E. Dameron, both of Newport News, Va., and Robert D. Boies, Cleveland, Ohio
Filed July 31, 1968, Ser. No. 749,148
Int. Cl. G01r 17/02
U.S. Cl. 324—72                                        4 Claims

ABSTRACT OF THE DISCLOSURE

An instrument for determining equipotential lines on a two-dimensional electric field plot and for measuring the potential at any selected point on the plot. The essential elements of the instrument are a dual triode for comparing the potentials applied to its two grids with a probe connected to one of its grids and with means for applying measured potentials to its other grid.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The invention relates generally to electric field plotting and more specifically concerns a simple instrument that provides a fast means for plotting electrostatic fields surrounding experimental components drawn in conductive ink on conductive paper.

In developing certain electronic components or devices such as ionization sources, detectors, vacuum gages, mass spectrometers, etc., it is generally advantageous to resort to two-dimensional plotting of electric fields and force lines prior to moving from the drawing board to prototype construction.

The prior art procedure of two-dimensional plotting to develop an electronic device consists of drawing an outline of the device on conducting (facsimile) paper with low resistance paint; applying D.C. potentials, which have been scaled down to a few volts in the ratios that are to be used on the device, to painted electrodes; and measuring with a standard voltmeter the field strength on the paper relative to electronic placement. This prior art procedure is time-consuming, particularly when a significant amount of plotting is done and it requires skill on the part of the technician in interpolating voltmeter readings.

It is therefore an object of this invention to provide an instrument for two-dimensional plotting that reduces the plotting time required by the prior art.

Another object of this invention is to provide an instrument for two-dimensional plotting that does not require the skill to operate that is required by the prior art.

A further object of this invention is to provide an instrument for two-dimensional plotting that will measure the potential at any given point on the two-dimensional surface and will locate points or lines on the two-dimensional surface that have a selected potential.

Other objects and advantages of this invention will become apparent hereinafter and in the drawing in which the single figure in this application is a schematic diagram of the preferred embodiment of the invention.

Turning now to the sole figure in this application, the number 11 designates a standard plug for connection with a 110 volt A.C. power source. The 110 voltage is connected through a switch 12 to the primary winding 13 of a transformer 14. Switch 12 is used for the purpose of disconnecting the 110 volts from winding 13 without unplugging plug 11. Transformer 14 has three secondary windings 15, 16 and 17. The voltage in winding 15 is applied to a rectifier consisting of diodes 18 and 19. The output from this rectifier is applied through a filter 20 to a resistor 21. Resistor 21 is connected in series with resistors 22, 23, 24 and 25 to ground. A switch 26 having fixed contacts 27–30 and movable contact 31, has contact 27 connected to the junction of resistors 21 and 22, contact 28 connected to the junction of resistors 22 and 23, contact 29 connected to the junction of resistors 23 and 24, and contact 30 connected to the junction of resistors 24 and 25. The movable contact 31 of switch 26 is connected to a potentiometer 32 which is connected in series with a resistor 32a to ground.

A switch 33, having fixed contacts 34–37 and movable contact 38, has contact 34 connected through a resistor 39 to ground, contact 35 connected through a resistor 40 to ground, contact 36 connected through a resistor 41 to ground and contact 37 connected through a resistor 42 to ground. The resistances of resistors 39–42 decrease as their numbers increase. That is, resistor 40 is less than 39, 41 is less than 40, etc. The slider of potentiometer 32 is connected to the plates of a dual triode 43 and through an ammeter 44 to movable contact 38. Movable contacts 31 and 38 are mechanically connected together so that they change in unison.

The plate voltage switching circuit controlled by switches 26 and 33 acts as a ranging circuit by altering the total amount of plate current passed. With the plate voltage high (when movable contact 31 is on contact 27 and movable contact 38 is on contact 34), a given small change in grid voltage will have a greater effect on plate current than will the same change with the plate voltage low (when switches 26 and 33 are in the positions shown), and will cause a larger deflection of ammeter 44. It therefore amplifies or attenuates the range by changing the amount of input required for full scale deflection of the meter. Because it is not possible to measure below zero (ground) potential, a judicious choice of the reference point must be made to avoid tube cutoff. This causes no real problem since the fields produced are a function of potential differences between electrodes on the paper rather than of their absolute values. Thus, a zero-2 volt 4 volt plot using the 2-volt electrode as reference will be identical to a plot of minus 2 volts-zero-2 volts using zero as reference.

The voltage induced across secondary winding 16 of transformer 14 is applied to a rectifier 45. The output from rectifier 45 passes through a filter 46 to a potentiometer 47. The slider of potentiometer 47 is connected to contacts 49 and 50 of a switch 48 having stationary contacts 49, 50 and 51, and having a movable contact 52. Contact 51 is connected to ground and movable contact 52 is connected to grid 53 of dual triode 43. A voltmeter 54 is connected between the slider of potentiometer 54 and ground. The voltage induced across secondary winding 17 of transformer 14 is applied to the filaments of dual triode 43.

A cathode 55 of triode 43 is connected to a null meter 56 and resistors 57 and 58. The other cathode 59 of triode 43 is connected to null meter 56, and resistor 57 and 60. A potentiometer 61 with its slider grounded is connected between resistors 58 and 60.

The other grid 62 of triode 43 is connected to the movable contact 63 of a switch 64 having stationary contacts 65, 66 and 67. Switch 64 operates in unison with switch 48. Contact 65 is connected to a probe 68 and contacts 66 and 67 are connected to ground. A capacitor 69 that will pass high frequency signals is connected between contact 65 and ground. Probe 68 is shown in contact with a two-dimensional plot 70 laid on a supporting means 71. Only a partial side view of plot 70 and supporting means 71 is shown.

There are two possible modes of operation of the instrument that constitutes this invention. The first, or standard, mode of operation is for tracing a particular line on the two-dimensional plot. The second, or fixed point, mode of operation is for measuring a potential at any given point on the two-dimensional plot with minimum difficulty. Before operating in either mode the desired sensitivity is obtained by adjusting potentiometer 32 and switches 26 and 33. Then with movable contact 52 of switch 48 on contact 51 and with movable contact 63 of switch 64 on contact 67 a null between cathodes 55 and 59 of triode 43 must be observed on meter 56. Null in this position is accomplished by adjusting potentiometer 61.

For the standard mode of operation movable contact 52 of switch 48 is put on contact 50 and movable contact 63 of switch 64 is put on contact 66. Then the potential to be found on the plotting paper is placed on grid 53 of triode 43 by adjusting potentiometer 47 and observing meter 54. For ease of operation, values chosen are usually integers or decimal fractions of two significant figures. The null meter 56 will now be deflected due to the unbalance of dual triode 43. Switches 48 and 64 are then placed in the position shown. With the switches in this position, probe 68 is placed on the plotting paper and moved along until meter 56 returns to null, indicating that the voltages applied to grids 53 and 62 are equal. Meter 56 is so connected that deflections to the left of null position indicate voltages lower than the reference. Observing the direction of the meter deflection while probing eliminates the need for interpreting a meter reading at each position, thereby providing a simplified method of locating the potential line. The value of the next potential line to be located is placed on grid 53 and the above procedure repeated until the plot is completed.

For the fixed point mode of operation switches 48 and 64 are placed in the position shown. Probe 68 is then placed on the plotting paper at the point where the potential is to be measured. Potentiometer 47 is adjusted until meter 56 is again at null. The voltage corresponding to the voltage at probe 68 is then read on meter 54.

Identical plots made with the instrument that constitutes this invention and by the previously used voltmeter method have clearly established that a significant reduction in plotting time can be realized. Use of the instrument results in an estimated 50 percent reduction of the technician time required for any given plot. Also, examination of the plots made by different operators when the same fields were traced shows that the plots are more nearly the same.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. An instrument for determining a line on a two-dimensional electric field plot that has a given potential at every point along the line and for measuring the potential at any selected point on the two-dimensional plot comprising:

comparing means with first and second terminals for indicating when the potentials applied to the two terminals are equal;

means for measuring and applying any selected potential within a range to a third terminal wherein said range includes all potentials on said two-dimensional plot;

a probe; and a three position switching means for connecting both said first and second terminals to ground when the switching means is in its first position, for connecting said first terminal to said third terminal and said second terminal to ground when the switching means is in its second position, and for connecting said first terminal to said third terminal and said second terminal to said probe when the switching means is in its third position.

2. An instrument according to claim 1 wherein said comparing means includes a null meter connected between said first and second terminals for indicating when the potentials applied to the two terminals are equal.

3. An instrument according to claim 2 wherein said comparing means includes a balancing network connected between said first and second terminals for adjusting said null meter to null when said first and second terminals are each connected to ground.

4. An instrument according to claim 1 wherein said means for measuring and applying includes a potentiometer with its slider connected to said third terminal; a voltage source, having a magnitude at least as great as the greatest potential on said two-dimensional plot, connected across said potentiometer; and a voltmeter for measuring the voltage at said slider.

References Cited

UNITED STATES PATENTS

| 2,542,478 | 2/1951 | Clark. | |
| 3,005,156 | 10/1961 | Hoberman | 324—123 XR |
| 3,222,599 | 12/1965 | Gewirtz | 324—123 |

RUDOLPH V. ROLINEC, Primary Examiner

E. L. STOLARUN, Assistant Examiner

U.S. Cl. X.R.

324—98